United States Patent [19]
Minakuchi

[11] Patent Number: 5,119,360
[45] Date of Patent: Jun. 2, 1992

[54] CONTROLLING A LASER USED WITH AN OPTICAL DISK APPARATUS

[75] Inventor: Tadashi Minakuchi, Tokyo, Japan

[73] Assignee: Asahi Kogaku Kogyo Kabushkiki Kaisha, Tokyo, Japan

[21] Appl. No.: 450,679

[22] Filed: Dec. 14, 1989

[30] Foreign Application Priority Data

Dec. 14, 1988 [JP] Japan ................................ 63-315956

[51] Int. Cl.⁵ .............................................. G11B 7/00
[52] U.S. Cl. .................................................. 369/116
[58] Field of Search ...................... 369/116; 346/76 L; 372/31, 38

[56] References Cited

U.S. PATENT DOCUMENTS

4,685,097 8/1987 Van der Put .......................... 369/54
4,698,797 10/1987 Komatsu ............................. 369/116
4,785,443 11/1988 Minami et al. ....................... 369/116

*Primary Examiner*—Robert L. Richardson
*Attorney, Agent, or Firm*—Sandler, Greenblum & Bernstein

[57] ABSTRACT

During playback of data from a recording medium, a light source emitting a light beam incident on the recording medium is driven by a first drive circuit. During this time, a first control circuit produces a control signal to the first driving circuit and controls the first drive circuit such that a power of the light beam is kept constant. During recording of data, on the other hand, a second drive circuit supplies a drive current in superimposition on a drive current from the first drive circuit with a timing corresponding to the recording data. During this time, the control of first drive circuit by the first control circuit is inhibited. However, the control signal immediately before the inhibition is held, and hence the light source is continually driven by the first drive circuit. Thus only a single reference level is necessary for the power control, thus permitting simplification of the construction and cost reduction.

11 Claims, 6 Drawing Sheets

CONTROLLING A LASER USED WITH AN OPTICAL DISK APPARATUS

BACKGROUND OF THE INVENTION

1. Field of the Invention

The present invention is related to an automatic power controlling apparatus to be used, for example, with an optical disk apparatus.

2. Discussion of Background and Other Information

When playing back data from an optical disk apparatus, a laser beam, having a comparatively low intensity, is incident to an optical disk. On the other hand, when recording data, a laser of a higher intensity than that used during playback is necessary to effect a change in the optical characteristics of the optical disk, so as to form pits thereon. Meanwhile, a semiconductor laser which serves as a light source of the laser beam cannot be driven with a constant current because of threshold current variations in the laser with temperature. When playback and recording operations are repeatedly performed, the temperature of the light sources varies, causing variations in the playback signal level. In addition, various servo systems become unstable. Furthermore, the recording power, which is adjusted to an optimum level, is varied, resulting in recordings with an inadequate intensity and deterioration of the signal-to-noise ratio during playback. To preclude the above defects, an automatic power controlling apparatus is provided.

In a prior art automatic power controlling apparatus, two reference intensity levels are provided for playing back and recording data. During playback, the laser beam intensity is controlled to a first reference level. During recording, the laser beam intensity is controlled to the first reference level and a second reference level, respectively, in accordance with the recording data in a high frequency.

Since, in the prior art apparatus, the laser beam power is controlled by two reference levels, the construction is complicated and the apparatus is expensive.

SUMMARY OF THE INVENTION

An object of the present invention is to solve the defects mentioned above.

Another object of the present invention is to provide an automatic power controlling apparatus, which is simple in construction and inexpensive in cost.

To attain the above objects of this invention, there is provided an automatic power controlling apparatus, comprising:

first means for driving a light source which emits a light beam at the time of playing back data from a recording medium and also at the time of recording data thereon;

second means for driving said light source according to said recording data at the time of recording;

means for generating a control signal to control said first drive means in correspondence to a difference between a power of said light beam emitted from said light source and a first reference level, so that said power of said light beam is kept constant; and means for inhibiting said control of said first drive means by said control means at the time of recording and also causing said first drive means to supply a constant current to said light source.

During playback, the light source is driven by the first drive means. During this time, the first control means controls the first drive means such that the intensity of the light beam from the light source is kept constant.

During recording, the second drive means supplies a drive current with an optimum intensity to the light source in superimposition on the drive current from the first drive means with a timing corresponding to the recording data. During this time, the control of the first drive means by the control means is inhibited. However, a control signal immediately before the inhibition is held. Therefore, the light source is continually driven by the first drive means as well as by the second drive means.

Thus, only a single reference level is needed for the power control, permitting a simplification of the construction and reduction in the cost of the device.

DETAILED DESCRIPTION OF THE PREFERRED EMBODIMENT

Figures 1, 1A:
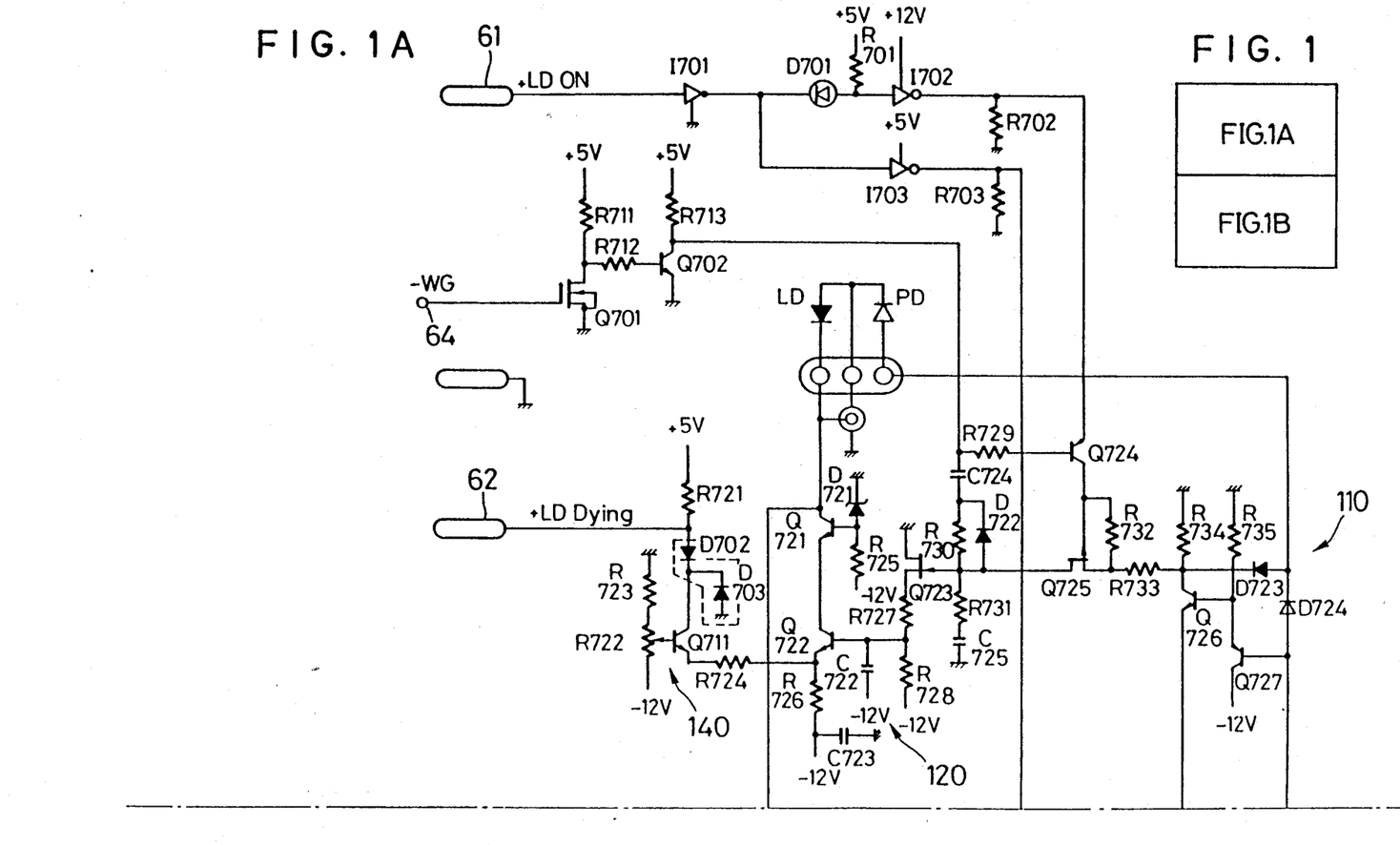
FIGS. 1A and 1B are circuit diagrams showing an automatic power controlling apparatus embodying this invention.
Figure 1B:
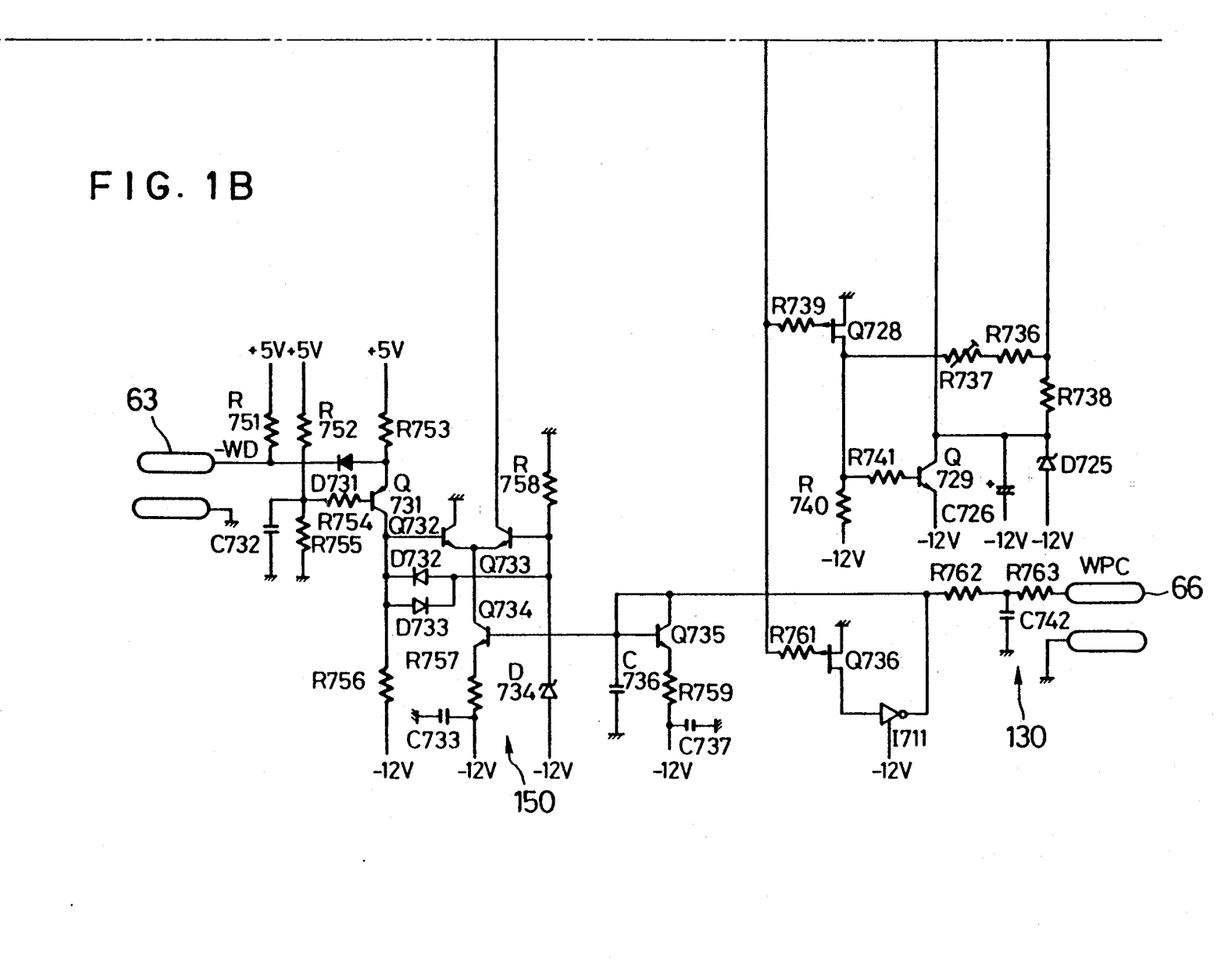
Figure 5:
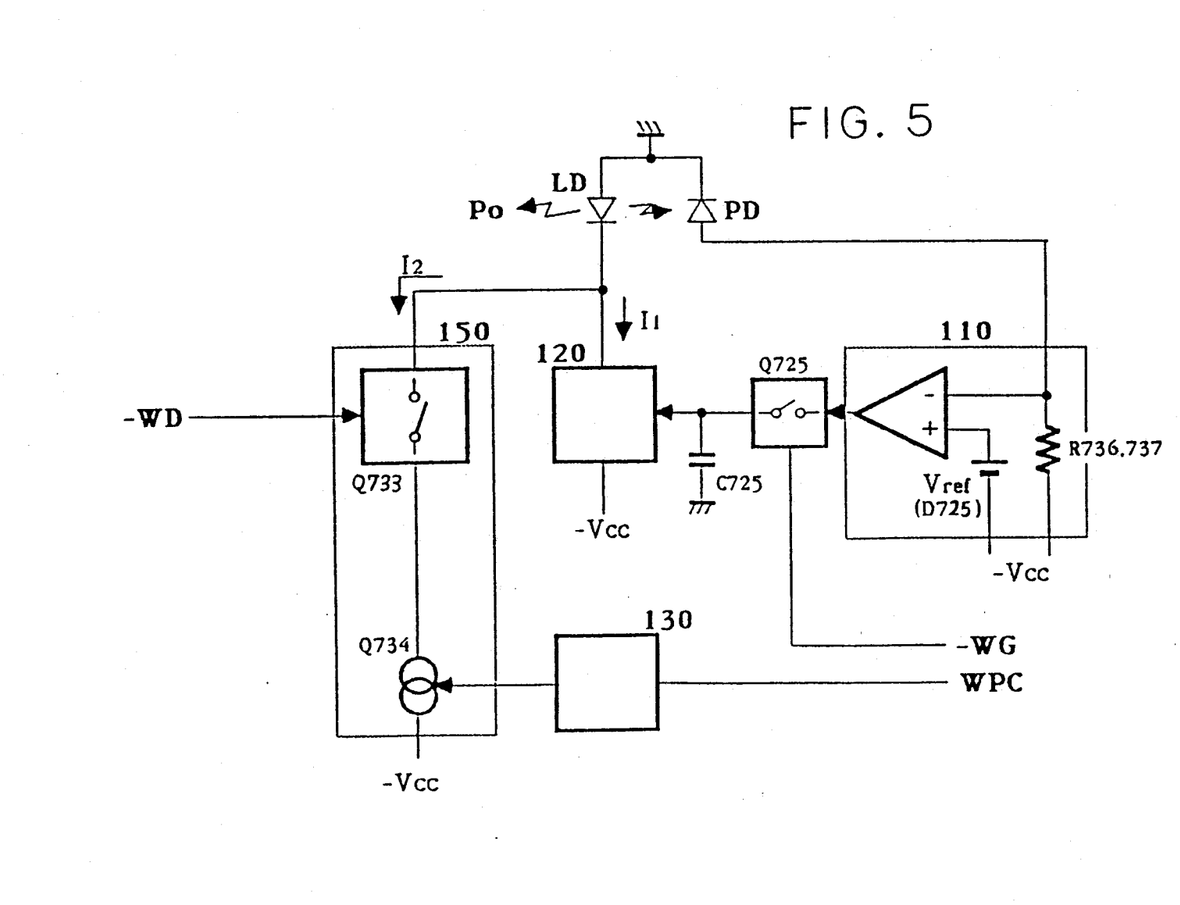
FIG. 5 is a block diagram showing an automatic power controlling apparatus embodying this invention.

FIG. 1 is a circuit diagram showing an automatic power controlling apparatus embodying the present invention. The circuit diagram can be summarized as shown in FIG. 5. Signal +LD ON is supplied from a microcomputer (not shown) to terminal 61. This signal assumes a logical level H when a semiconductor laser LD, which functions as a light source, is driven, and a logic level L otherwise.

When the logic level H is supplied to terminal 61, transistor I701 provides a logical level L to turn ON light-emitting diode D701. Also, translator I702 provides a logic level H to supply a positive voltage to the emitter of transistor Q724.

Figure 2A:
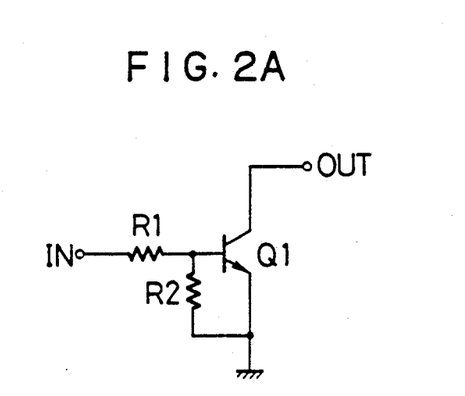
FIGS. 2A and 2B are equivalent circuits of transistors with resistors.

Transistor I701 comprises an NPN transistor Q1 and resistors R1 and R2, as shown in FIG. 2A. Transistor I701 outputs a logic level L when a logic level H is inputted, because NPN transistor Q1 is turned ON. The output of transistor I701 is OPEN when a logic level L is inputted, because NPN transistor Q1 is turned OFF.

Figure 2B:
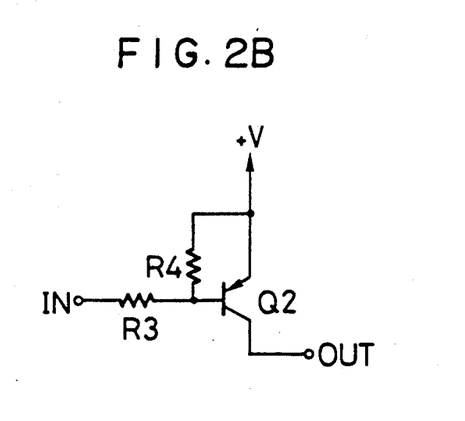

Transistor I702 comprises a PNP transistor Q2 and resistors R3 and R4, as shown in FIG. 2B. Transistor I702 outputs a logic level H when a logic level L is inputted, because PNP transistor Q2 is turned ON. The output of transistor I702 is OPEN when a logic level H is inputted, because PNP transistor Q2 is turned OFF.

In a playback mode (i.e., not a recording mode), signal WG to terminal 64 is set to a logic level H. In consequence, FET Q701 is turned OFF while transistor Q702 is turned ON, thus turning ON transistor Q724 to turn ON FET Q725 as an inhibiting means.

Now, an output of control circuit 110, which comprises transistors Q726, Q727 and Q729 and FET Q728, can be supplied through FET Q725 to a drive circuit 120, comprising transistors Q721 and Q722 and FET Q723.

When transistor I701 provides a logic level L, transistor I703, with a structure as shown in FIG. 2B, provides a logic level H. As a result, FET Q728 is turned OFF, and the control circuit 110 is now ready for operation. Likewise, FET Q736 is turned OFF, and the output of transistor I711, with a structure as shown in FIG. 2A, is OPEN, so that control circuit 130, comprising resistor R763 and capacitor C742, is ready for operation.

The semiconductor laser LD is driven by the drive circuit 120 to emit a laser beam. At least part of the laser beam is received by a photo detector PD. The photo detector PD thus provides a current corresponding to the intensity of the laser beam.

The current outputted from the photo detector PD is supplied to the control circuit 110 for conversion to a voltage through resistors R736 and R737. The potential on the base of transistor Q726 (i.e., the emitter of transistor Q727) is greater than the emitter potential thereof by a base-emitter voltage Vbe, and the potential on the base of transistor Q727 is less than the emitter potential thereof by a base-emitter voltage Vbe. Thus, the potentials of the emitter of transistor Q726 and base of transistor Q727 are stabilized at substantially the same level. The potential on the emitter of transistor Q726 is clamped to a predetermined reference potential via zener diode D725. The potential on the base of transistor Q727 is also stabilized with this reference potential.

Figure 4:
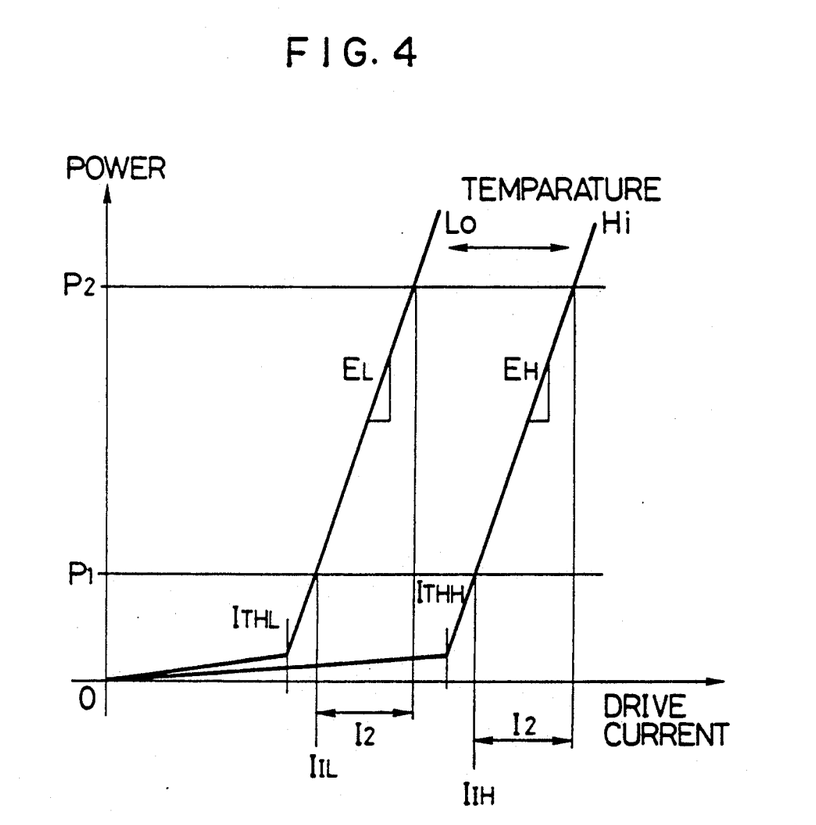
FIG. 4 is a graph showing an output characteristic of a semiconductor laser.

FIG. 4 shows the characteristics of a power versus drive current of the semiconductor laser. When the drive current is constant, the power is increased with reducing temperature. Thus, with a temperature reduction, the output intensity of semiconductor laser LD is increased. Thus, the output current of photo detector PD is increased.

As a result, the voltage drop across resistors R736 and R737 is increased and the base potential on transistor Q727 is increased. At this time, the potential on the emitter of transistor Q727 (i.e., the base of transistor Q726) is increased and the collector potential on transistor Q726 is reduced. Thus, the potentials on the gate of FET Q723 and also on the base of transistor Q722 are reduced and the current flowing through transistor Q722, namely through the semiconductor laser LD, is reduced.

Likewise, with the reduction of the base potential on transistor Q727, the current flowing through transistor Q722 is increased and the output of semiconductor laser LD is increased. Thus, a servo is provided to make the base potential of transistor Q727 and the reference potential supplied through zener diode D725 equal, so that the power of the semiconductor laser LD is held constant.

Thus, the current flowing though the semiconductor laser LD (and hence, through transistors Q721 and Q722) is controlled to be at a level I1L at a low temperature and a level I1H at high temperature, so that the power of the laser beam from the semiconductor laser LD is kept at a constant level P1, which corresponds to the playback level, as shown in FIG. 4.

When the semiconductor laser LD is operating normally, the current flowing through resistor R726 connected with the emitter of transistor Q722 is below a predetermined level. Thus, the terminal voltage across resistor R726 is less than a base potential on transistor Q711 set by resistors R723 and R722. Thus, transistor Q711, constituting a detecting circuit 140 is ON, and signal +LD at terminal 62 is a logic level L. When the drive current is increased due to a cause, such as a deterioration of the semiconductor laser LD, the terminal voltage across resistor R726 is increased and transistor Q711 is turned OFF. Thus, the signal at terminal 62 is inverted to a logic level H. When a microcomputer receives this logic level L signal, it determines that there has been an abnormality in the semiconductor laser and activates an alarm display or the like.

In the recording mode, signal −WG at terminal 64 is inverted to a logic level L. As a result, FET Q701 is turned ON, transistors Q702 and Q724, and FET Q725 are turned OFF and the control of the drive circuit 120 by the control circuit 110 is inhibited. At this time, the previous drive voltage is held by capacitor C725, so that the current supplied to the semiconductor laser LD is maintained at the previous level I1 in the drive circuit 120. Recording is usually performed sector by sector. Thus, the holding time of capacitor C725 is set in correspondence to at least the sector recording time (i.e., 2 msec.).

When a recording signal −WD, with a logic level L, is supplied to terminal 63, transistors Q731 and Q732 included in drive circuit 150 are turned OFF. As a result, transistor Q733, in a differential connection with respect to transistor Q732, is turned ON. Thus, a current flows through a path comprising the semiconductor laser LD and transistors Q733 and Q734.

When the current flowing through transistors Q733 and Q734 is equal to I2, the laser beam intensity is P2, as shown in FIG. 4. In other words, the sum current I3 (the total of I1+I2) summing the currents I1 and I2 supplied from the respective drive circuits 120 and 150, flows through the semiconductor laser LD.

In the recording mode, signal WPC is supplied to terminal 66. Signal WPC is generated from the circuit shown in FIG. 3.

Figure 3:
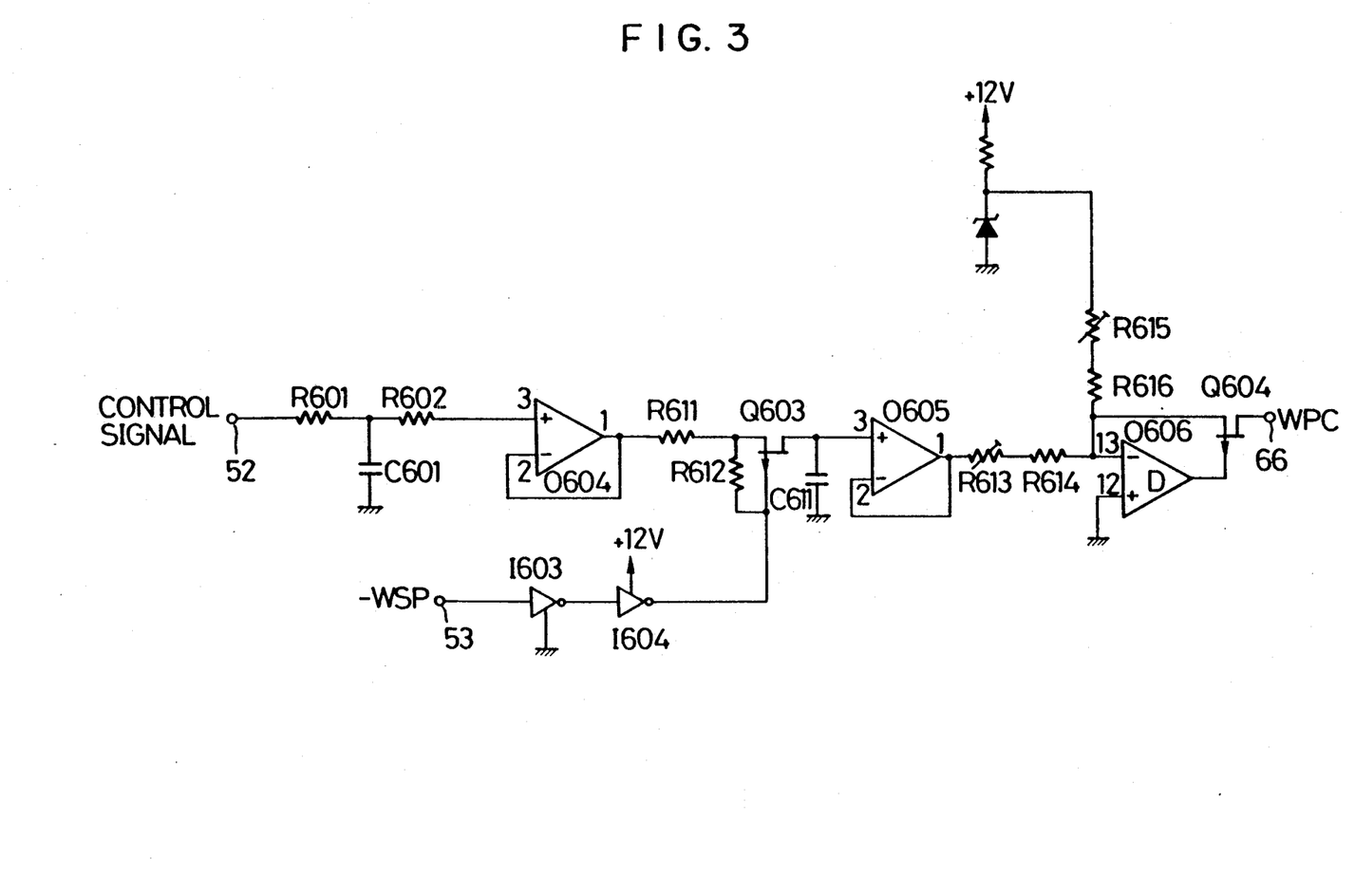
FIG. 3 is a circuit diagram showing an apparatus for generating a control signal.

More specifically, the microcomputer provides control data in correspondence to the head position in the radial direction of the disk. This digital control data is converted to an analog signal and supplied to terminal 52. The control signal is integrated by a circuit comprising resistor R601 and capacitor C601, and then provided to operational amplifier O604 which functions as a buffer. The microcomputer provides a signal −WSP to terminal 53 at a predetermined timing. When the signal −WSP is at a logic level L, the outputs of transistors I603 and I604, having structures as shown in FIGS. 2A and 2B, respectively, are OPEN and FET Q603 is turned ON. As a result, capacitor C611 is charged by the output of operational amplifier O604. When the signal at terminal 53 is inverted to a logic level H, FET Q603 is turned OFF, and capacitor C611 holds its charged voltage. This charged voltage is amplified by operational amplifiers O605 and O606 and FET Q604, and outputted as signal WPC to terminal 66.

The WPC signal is supplied for integration from terminal 66, shown in FIG. 1, to control circuit 130, comprising resistor R763 and capacitor C742.

The output of control circuit 130 is supplied through resistor R762 to transistor Q735 of the drive circuit 150. Diode-connected transistor Q735 and transistor Q734 constitute a current mirror circuit. Hence, the same current flows through transistors Q735 and Q734.

In the above way, during recording, current I2 flowing through transistor Q734 is controlled according to the head position in the radial direction of the disk, such that it is increased as the head goes towards the outer edge of the disk.

The output characteristics of the semiconductor laser LD, as shown in FIG. 4, are such that a light emission efficiency E (inclination angle) is substantially constant, irrespective of the temperature, although a threshold current $I_{TH}$ varies with temperature. That is, a light emission efficiency $E_H$ at a high temperature and a light emission efficiency $E_L$ at a low temperature are substantially equal, although threshold current $I_{THH}$ at a high temperature is larger than threshold current $T_{THL}$ at a low temperature. Furthermore, as noted above, in the recording mode, the drive circuit 120 continually supplies the drive current at the level I1 corresponding to a level immediately before the switching to the recording mode. Therefore, the low level output of the semiconductor laser LD is held at a constant level P1, irrespective of the temperature at that time. Thus, by holding the drive current I2 of the drive circuit 150 constant irrespective of temperature, the high level output of the semiconductor laser LD can be held constant.

The variation of the drive current I2 (i.e., the power P2) according to the head position in the radial direction of the disk, is performed because the more the head goes toward the outer edge of a CAV (constant angular velocity) disk, the higher is the relative speed of the disk with respect to the head, and thus a higher intensity is necessary for recording data (i.e., forming the pits). In other words, the variation noted above is performed from an essentially different ground from that for an automatic power control servo based on temperature characteristics.

What is claimed is:

1. An automatic power controlling apparatus, comprising:
    first means for driving a light source which emits a light beam at the time of playing back data from a recording medium and also at the time of recording data thereon;
    second means for driving said light source according to said recording data at the time of recording;
    means for generating a control signal to control said first drive means corresponding to a difference between a power of said light beam emitted from said light source and a first reference level so that said power of said light beam is kept constant; and
    means for inhibiting said control of said first drive means by said control means at the time of recording and also for causing said first drive means to supply a constant current to said light source.

2. An automatic power controlling apparatus according to claim 1,
    wherein said light source comprises a semiconductor laser, and said light beam comprises a laser beam, said apparatus further comprising a photo detector for detecting at least a part of said laser beam emitted from said semiconductor laser and generating a signal in compliance with said power of said laser beam.

3. An automatic power controlling apparatus according to claim 2, wherein said control means comprises:
    means for generating said first reference level; and
    means for comparing said power of said laser beam and said first reference level.

4. An automatic power controlling apparatus according to claim 3,
    wherein said first reference level generating means comprises a zener diode and said comparing means comprises at least one resistor for converting a current outputted from said photo detector into a voltage and at least one transistor for comparing said first reference level with said voltage converted by said resistor.

5. An automatic power controlling apparatus according to claim 1, wherein said inhibiting means comprises:
    means for controlling a transmission of said control signal from said control means into said first drive means; and
    means for holding said control signal.

6. An automatic power controlling apparatus according to claim 5,
    wherein said holding means comprises a capacitor and said switching means transmits said control signal to said capacitor at the time of playback, and inhibits said transmission of said control signal to said capacitor and has a voltage charged on said capacitor to be supplied to said first drive means at the time of recording.

7. An automatic power controlling apparatus according to claim 1,
    wherein said second drive means comprises a current mirror circuit.

8. An automatic power controlling apparatus according to claim 1,
    wherein said apparatus further comprises means for detecting abnormalities of said light source.

9. An automatic power controlling apparatus according to claim 8, wherein said detecting means comprises:
    means for detecting a current driving said light source at the time of playback and converting said current into a voltage; and
    second means for comparing said voltage with a second reference level.

10. An automatic power controlling apparatus according to claim 1, wherein said recording medium is a CAV type disk, said apparatus further comprising:
    means for generating a second control signal in compliance with a recording position in a radial direction of said disk; and
    means for controlling said second drive means according to said second control signal.

11. An automatic power controlling apparatus according to claim 1,
    wherein said second drive means includes a switching means for switching in accordance with said recording data.

* * * * *

UNITED STATES PATENT AND TRADEMARK OFFICE
CERTIFICATE OF CORRECTION

PATENT NO. : 5,119,360
DATED : June 2, 1992
INVENTOR(S) : T. MINAKUCHI

It is certified that error appears in the above-indentified patent and that said Letters Patent is hereby corrected as shown below:

On the title page, item [73], Assignee, line 1, change "Kabushkiki" to ---Kabushiki---.

Signed and Sealed this

Seventeenth Day of October, 1995

BRUCE LEHMAN

*Attest:*

*Attesting Officer*     *Commissioner of Patents and Trademarks*